United States Patent [19]
Mani et al.

[11] Patent Number: 4,629,545
[45] Date of Patent: * Dec. 16, 1986

[54] ELECTRODIALYTIC WATER SPLITTER AND PROCESS FOR REMOVAL OF $SO_2$ FROM GASES CONTAINING SAME AND FOR RECOVERY OF $SO_2$ AND NAOH

[75] Inventors: Krishnamurthy N. Mani, Denville; Frederick P. Chlanda, Rockaway, both of N.J.

[73] Assignee: Allied Corporation, Morris Township, N.J.

[*] Notice: The portion of the term of this patent subsequent to Nov. 12, 2002 has been disclaimed.

[21] Appl. No.: 775,937

[22] Filed: Sep. 10, 1985

Related U.S. Application Data

[63] Continuation of Ser. No. 639,611, Aug. 10, 1984, abandoned, which is a continuation of Ser. No. 490,944, May 2, 1983, abandoned.

[51] Int. Cl.$^4$ .................................. B01D 13/02
[52] U.S. Cl. ......................... 204/182.4; 204/301; 423/242; 423/206 T; 55/73
[58] Field of Search .................... 204/301, 182.4; 423/242 A, 206 T; 55/73

[56] References Cited

U.S. PATENT DOCUMENTS

| | | | |
|---|---|---|---|
| 3,515,513 | 6/1970 | Parsi | 204/180 P |
| 3,904,733 | 9/1975 | Gancy et al. | 423/206 T |
| 4,082,835 | 4/1978 | Chlanda et al. | 423/242 A |
| 4,385,039 | 5/1983 | Lowell et al. | 423/242 A |
| 4,552,635 | 11/1985 | Jenczewski et al. | 204/182.4 |

OTHER PUBLICATIONS

Patent Memorandum 01-78, entitled "Electro Chemical Sulfur Oxide Pollution Control Process for Sulfuric Acid Plants" by T. J. Jenczewski and W. H. Skinner.

Primary Examiner—John F. Niebling
Assistant Examiner—B. J. Boggs, Jr.
Attorney, Agent, or Firm—Gus T. Hampilos; Gerhard H. Fuchs

[57] ABSTRACT

An electrodialytic water splitting process for recovering $SO_2$-containing gases for converting the spent materials used in alkaline sodium scrubbing of $SO_2$-containing gases into NaOH. The alkaline sodium scrubbing materials such as $Na_2CO_3$, $NaHCO_3$ or mixtures thereof are used in the form of an aqueous slurry or aqueous solution to scrub $SO_2$ from gases containing same to form a reaction mixture comprising $Na_2SO_3$, $Na_2SO_4$, and possibly $NaHSO_3$, and a gas depleted in $SO_2$. The reaction mixture is contacted with an aqueous hydrogen ion solution comprising $Na_2SO_4$ and $H_2SO_4$ formed in an acid compartment of a two- or three-compartment electrodialytic water splitter to form a solution comprising aqueous $SO_2$ values and aqueous $Na_2SO_4$. Contact of the reaction mixture with the aqueous hydrogen ion solution may be performed externally, of the water splitter or internally, in an acid compartment of the water splitter. Gaseous $SO_2$ can then be recovered from the aqueous $SO_2$ values. A liquid comprising water and at least a portion of the aqueous sodium values in the aqueous $Na_2SO_4$ is transfered to a base compartment of the electrodialytic water splitter to produce a liquid comprising aqueous NaOH. The aqueous solution comprising NaOH can then be recovered from the base compartment.

19 Claims, 9 Drawing Figures

ELECTRODIALYTIC WATER SPLITTER AND PROCESS FOR REMOVAL OF SO₂ FROM GASES CONTAINING SAME AND FOR RECOVERY OF SO₂ AND NAOH

This application is a continuation of application Ser. No. 639,611 filed Aug. 10, 1984, abandoned, which is a continuation of application Ser. No. 490,944 filed May 2, 1983, abandoned.

BACKGROUND OF THE INVENTION

This invention relates to an electrodialytic process for removal of $SO_2$ from gases containing same and production of $SO_2$ and NaOH. More particularly, the invention relates to the removal of $SO_2$ from gases containing same by spray-drying or aqueous solution scrubbing with alkaline sodium sources, e.g., trona ore, nahcolite ore or soda ash, and the production of $SO_2$ and NaOH from spent sodium materials (from $SO_2$ scrubbing) using therefor electrodialytic water splitters.

Environmental considerations precludes the burning of fuels with high sulfur content, since the consequent production of sulfur dioxide presents a serious pollution problem. To overcome this, the sulfur in the fuel must be removed prior to, during or after combustion. For users of large quantities of fuel, such as utility companies, removal of sulfur after combustion generally has been recognized as most feasible. In this regard, considerable research has been done and a number of processes for removal of sulfur dioxide from the combustion gases have been developed. Among these are lime and limestone scrubbing processes, magnesium oxide scrubbing processes, sodium scrubbing processes with thermal regeneration (e.g., see U.S. Pat. Nos. 3,477,815 and 3,485,581), sodium scrubbing with electrolytic regeneration (e.g., see U.S. Pat. No. 3,475,122) citrate processes [U.S. Bureau of Mines (Report of Investigations 7774, (1973)], phosphate processes [Stauffer Chemical, Chem. Eng. 81, July 8, pp. 46–47 (1974)], double alkali processes and the catalytic oxidation process for making sulfuric acid. A review of these and other processes has been made by A. V. Slack of Noyes Data Corp. ["Sulfur Dioxide Removal from Waste Gases"—Pollution Control Review No. 4 (1971)].

Many considerations enter into the decision of which type of process might be best. Among these are capital and operating costs, reliability, flexibility and operation, production of useful sulfur products, production, and disposal of byproducts. For example, sodium-based throwaway systems for flue gas desulfurization are disclosed in Power, October 1982, Special Report, pages S-10 to S-17. However, these throwaway systems often produce a liquid waste which requires a large, carefully contained holding pond to evaporate water from and concentrate the species dissolved in the liquid waste. Accordingly, the use of sodium-based throwaway systems are limited to regions where large tracts of land are available for ponding, the evaporation rate is high and exceeds rainfall, and low sulfor coal (containing about 1% by weight sulfur) is burned to produce less waste to be disposed of.

U.S. Pat. Nos. 4,082,835 and 4,107,015 disclose electrodialytic methods of removing and recovering $SO_2$ from flue gases containing same by (1) scrubbing the flue gas with an aqueous alkaline solution, e.g., NaOH, $Na_2SO_3$, a combination of both or any other relatively basic solution; (2) dividing the treated scrubbing solution into two streams; (3) feeding the two streams into a two-component electrodialytic water splitter; (4) withdrawing from said electrodialytic water splitter an aqueous alkaline solution which is recycled to the scrubbing step, and a $SO_2$-containing solution; (5) stripping the $SO_2$ from the solution containing same to produce a solution containing waste sulfate of which a portion is purged and (6) recycling the remainder of the waste sulfate containing solution to the scrubbing step. Thus, U.S. Pat. Nos. 4,082,835 and 4,107,015 disclose closed loop processes wherein the scrubbing solution is substantially completely recycled.

In addition, there are several common sources of $SO_2$-containing gas streams in which $SO_2$ is too dilute to be economically utilized directly as a source of sulfur for $H_2SO_4$ or sulfur manufacture. However, these common sources of $SO_2$ are of sufficient volume or concentration to present an environmental hazard if they are vented to the atmosphere. Major sources of such streams are: lead smelters, which might emit steams with $SO_2$ concentrations of about 0.1 to 5 percent; sulfuric plants emitting streams containing about 0.05 to about 1 percent $SO_2$; and flue gases from oil or coal fired boilers which may contain from about 0.004 percent to about 0.5 percent $SO_2$.

Among the methods used for treating such gases is scrubbing of the stream or sodium bases. In some cases, e.g., the dual alkali process or the processes of U.S. Pat. Nos. 4,082,835 or 4,107,015, are employed. In other cases, an inexpensive source of sodium base, such as naturally occurring mineral trona or nacholite or other $Na_2CO_3/NaHCO_3$ mixtures, is used for scrubbing and the spent scrubbing material is merely disposed of. Disposal of the spent scrubbing material can represent a substantial operating cost because of the environmental problems associated with leaching of soluble minerals therefrom and subsequent contamination of groundwater supplies.

One such throw-away process is generated by the aqueous scrubbing process known as solution scrubbing. In the process of solution scrubbing, a solution of a sodium base such as trona, nacoholite, soda ash, calcined trona or calcined nacoholite, or a liquors produced during the processing of trona ore, soda ash or nacoholite, or some other sodium carbonate and/or $NaHCO_3$ solutions is introduced into a scrubber for contact with a gas containing $SO_2$. The scrubber may be a packed tower, a tray absorption tower, or other device known to one skilled in the art. In a tower, a substantial amount of $SO_2$ is removed from the incoming gas and the gas exiting the scrubber contains a small enough amount of $SO_2$ so as not to pose an environmental hazard. The solution stream produced by such a process will comprise, and normally consists essentially of, $NaHCO_3$, $NaHSO_3$, $Na_2SO_4$, and $Na_2SO_3$. Typically, the solution will contain from about 0.1 to 15 percent $NaHSO_3$, about 0.1 to about 15 percent $NaSO_4$ and about 0.1 to about 10 percent $Na_2SO_3$ (all weight percent). The stream constitutes the waste which must be disposed of, normally by ponding.

Another throw-away waste is generated by the scrubbing process known as spray drying. A solution or slurry of sodium base such as trona, nacoholite, soda ash, calcined trona or calcined nacoholite, or a liquor produced during processing of trona ore, soda ash, or nacoholite, or other sodium carbonate and/or sodium bicarbonate solution is sprayed into a tower wherein the heat from the $SO_2$-containing gas causes the water to evaporate from the solution or slurry. The $SO_2$ in the incoming gas reacts with the base either in the spray or the dry particle form. In the process of spray drying, substantial quantities of $SO_2$ (normally about 40 percent up to about 99 percent of the $SO_2$), are removed from the gas resulting in gaseous effluent depleted in $SO_2$. The dry waste comprises $Na_2SO_4$, $Na_2SO_3$, sometimes $NaHSO_3$, as well as unreacted $Na_2CO_3$ and/or $NaHCO_3$. Normally, only small amounts of sodium bisulfite are present in the reaction mixture recovered when spray-dryer absorption is used.

BRIEF DESCRIPTION OF THE INVENTION

We have discovered an improved electrodialytic water splitting process for converting the spent materials produced by alkaline sodium scrubbing of sulfur dioxide from $SO_2$-containing gases into sodium hydroxide. The alkaline sodium scrubbing materials such as $Na_2CO_3$, $NaHCO_3$ or mixtures thereof (e.g., impure trona ore) in the form of an aqueous slurry or solution, scrub $SO_2$ from gases containing same by forming a reaction mixture comprising sodium sulfite (sodium sulfate, and sometimes sodium hydrogen sulfite). The reaction mixture is contacted with an aqueous hydrogen ion containing solution comprising sodium sulfate/sulfuric acid (as $NaHSO_4$) produced in an acid compartment of an electrodialytic water splitter, to form a solution comprising aqueous $SO_2$ values and aqueous sodium sulfate. The reaction mixture contacts the aqueous hydrogen ion containing solution either externally, i.e., in a reaction zone external and prior to the electrodialytic water splitter, or internally, i.e., in an acid compartment of the electrodialytic water splitter. At least a portion of the aqueous sodium values in the hydrogen ion containing solution is transferred to the base compartment for contact with a liquid comprising water to produce an aqueous solution comprising sodium hydroxide. The aqueous $SO_2$ values are then processed to recover $SO_2$ gas and the NaOH may also be recovered.

The present invention provides a process which comprises the steps of:

(a) contacting a gas comprising $SO_2$ with a reactant comprising $Na_2CO_3$, $NaHCO_3$, or mixtures thereof for a time sufficient to form a reaction mixture comprising sodium sulfite and sodium sulfate, and a gas depleted in $SO_2$;

(b) recovering said reaction mixture in the form of an aqueous solution;

(c) feeding said aqueous solution and a liquid comprising water to an electrodialytic water splitter;

(d) passing a current through said electrodialytic water splitter to produce an aqueous hydrogen ion-enriched solution comprising $Na_2SO_4$ and and to produce an aqueous hydroxide ion-enriched solution comprising sodium hydroxide and sodium sulfite; and (e) withdrawing said aqueous hydrogen ion-enriched solution comprising $H_2SO_3$ from said electrodialytic water splitter and producing a gaseous stream comprising $SO_2$ therefrom;

(f) withdrawing said aqueous hydroxide ion-enriched solution from said electrodialytic water splitter.

The present invention also provides a process which comprises the steps of:

(a) contacting a gas comprising $SO_2$ with $Na_2CO_3$, $NaHCO_3$ or mixtures thereof for a time sufficient to form a reaction mixture comprising sodium sulfite and sodium sulfate, and a gas depleted in $SO_2$;

(b) contacting said reaction mixture with a hydrogen ion-enriched aqueous solution for a time to produce an acidified aqueous solution comprising sodium sulfate and aqueous $SO_2$;

(c) separating said acidified solution into an aqueous solution comprising sodium sulfate and gaseous $SO_2$;

(d) recovering said gaseous $SO_2$;

(e) introducing at least a portion of said separated aqueous sodium sulfate solution and a liquid comprising water into an electrodialytic water splitter to produce a hydrogen ion-enriched aqueous solution comprising sodium sulfate and sulfuric acid and a hydroxide ion-enriched aqueous solution comprising sodium hydroxide and substantially free of sodium sulfate;

(f) withdrawing the hydrogen ion-enriched and hydroxide ion-enriched streams separately from the electrodialytic water splitter.

The present invention contemplates the use of two- or three-compartment water splitters. When a two compartment water splitter is employed, the aqueous solution (internal contact) or the aqueous sodium sulfate solution (external contact) is fed to the acid compartment and the liquid comprising water is fed to the base compartment. When a three-compartment water splitter is used, the aqueous solution (internal contact) or the aqueous sodium sulfate solution (external contact) is fed to the salt compartment and the liquid comprising water is fed to the acid and base compartment.

DETAILED DESCRIPTION OF THE INVENTION

The present invention involves the treatment of wastes from sodium-based scrubbing of SO$_2$ gases to generated valuable products including NaOH, SO$_2$ and Na$_2$SO$_4$.

We have discovered processes for treating wastes produced from gas scrubbing of SO$_2$-containing gases which are efficient.

In accordance herewith the wastes from solution and spray-dry scrubbing are treated by two- and three-compartment electrodialytic water splitting processes to convert them to the valuable products. There are several possible variations of the process and a specific arrangement will depend on the composition of the sodium effluent, the characteristics of the membranes available, the type of electrodialysis equipment available and the site of operation.

In general, the sodium effluent from the scrubber is initially acidified with hydrogen ions produced by electrodialytic water splitting. The acidification of the effluent allows the formation of sulfite salts and easy removal of SO$_2$ therefrom.

The acidification of the reaction mixture obtained from the aqueous solution or aqueous slurry scrubbing may be performed externally in a reaction zone separate from the electrodialytic water splitter or internally, i.e., within the acid compartment of an electrodialytic water splitter. By providing liberation of SO$_2$ prior and external to the electrodialytic water splitter in an alternative embodiment, the following advantages, among others, are obtained:

(1) self-construction is simplified and standardized and the application of back pressure on the cell is not necessary;

(2) the bipolar efficiency is improved compared to the electrodialytic processes operated with internal solidification under similar conditions, by avoiding diffusion of SO$_2$ through the bipolar membrane into the base compartment (thereby increasing the overall NaOH purity and production efficiency); and (3) the service-lifetime of the bipolar membrane is significantly extended by operating the system to produce NaOH and avoiding in situ evolution of SO$_2$ gas.

In preferred embodiments of the invention it may be necessary to treat the sodium effluent prior to entering the electrodialytic water splitter by filtatration to remove particulate matter and/or with carbonate and/or ion exchange material to remove therefrom cations which form insoluble hydroxides, especially Ca$^{++}$ and Mg$^{+2}$.

In addition to forming sulfite salts from which the SO$_2$ is recovered, the sodium effluent also provides the Na$^+$ ions which are combined with OH$^-$ produced in the water splitter to yield NaOH. Finally, the oxidation of SO$_2$ during the scrubbing step produces sodium sulfate as a constituent of the effluent. The sodium sulfate is ordinarily removed from the effluent by crystallization or evaporation to give a substantially pure, i.e., about 98% pure, Na$_2$SO$_4$. Thus the following reactions are important to the operation of the process.

Acidification:

$$H^+ + SO_3^{--} \rightarrow HSO_3^- \text{ within or}$$

$$H^+ + HSO_3^{31} \rightarrow H_2SO_3 \text{ external to}$$

$$H_2SO_3 \rightarrow H_2O + SO_3 \uparrow \text{ the water splitter}$$

In the water splitter:

$$H_2O + H^+ + OH^-$$

$$Na^+ + OH^- \rightarrow NaOH$$

Oxidation:

$$Na_2SO_3 + 0.5O_2 \rightarrow Na_2SO_4$$

Figure 1:
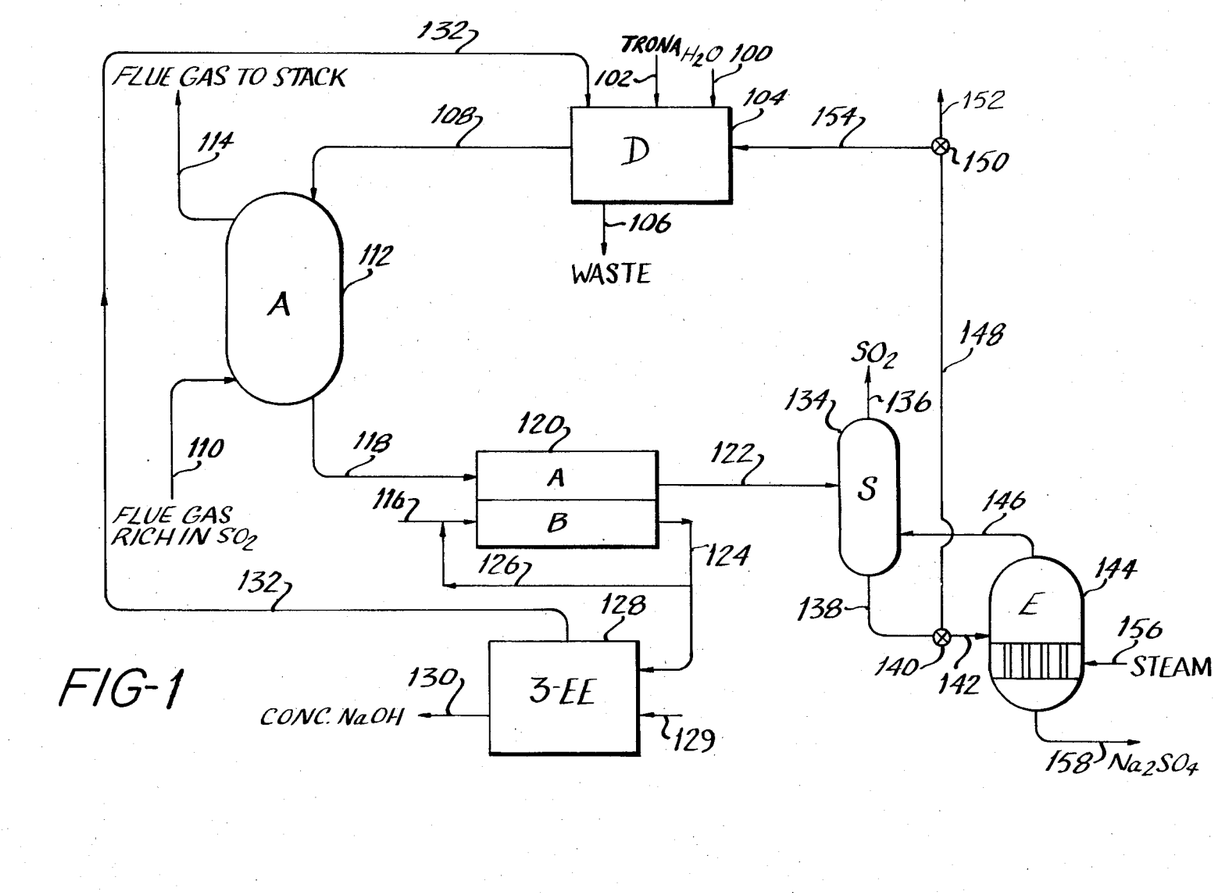
FIG. 1 is a flow diagram illustrating an embodiment of the present invention using wet scrubbing and a two-compartment electrodialytic water splitter.

In the embodiment of the process of the present invention illustrated in FIG. 1, the SO$_2$-rich gas (absent particulate material which may have been present and which was removed in a separate step prior to being processed) enters an absorber 112 from a line 110 wherein it reacts with an alkaline sodium-based scrubbing medium to form a bisulfite and to convert some of the sulfur values by oxidation to Na$_2$SO$_4$. The alkaline sodium-based scrubbing medium is fed via a line 108 to the absorber 112 and is typically uncalcined trona ore dissolved in Na$_2$SO$_4$ (recycled or added via line 102) or in makeup water (added via line 100) in a dissolution tank 104. While trona is used in this description, it is understood that various soluble sodium-based substances which are known to those skilled in the art may be used, for example, calcined and uncalcined nahcohlite ore, soda ash or hydrates thereof, liquors produced during processing trona ore, soda ash or nahcolite. Trona is crude sodium sesquicarbonate (NaHCO$_3$.Na$_2$CO$_3$.2H$_2$O); nahcolite is crude sodium bicarbonate; and soda ash is anhydrous Na$_2$CO$_3$.

The ion concentrations of Na$_2$CO$_3$, NaHCO$_3$, Na$_2$SO$_3$, NaHSO$_3$, NaOH and Na$_2$SO$_4$ in the scrubbing solutions in line 108 can vary over a wide range and are limited, in theory, only by their solubilities. In this embodiment, Na$_2$SO$_3$ produced in electrodialytic water splitter 120 and containing some NaOH is removed from triple effect evaporator 128 via line 132 and added to the sodium-based scrubbing medium dissolution tank 104.

The absorber 112 used in our invention may be one of a number of types that are well known in the literature. Specifically, a venturi absorber, tray towers, a plate absorber or a packed tower may be used. In addition, the abssorber may be equipped to remove any particulate material which enters with the SO$_2$-rich gas. The temperature of reaction can be between about 25° C., (77° F.) and 85° C. (185° F.). Preferably, the temperature is between about 30° C. (86° F.) and about 70° C., (158° F). More preferably the temperature is the adiabatic saturation temperature which is typically about 55° C. (131° F). The exact composition of the reaction mixture comprising sodium values and absorbed sulfur values in the absorber 112 will depend on the incoming absorption liquor composition, the design of the absorber, the degree of SO$_2$ removal sought, and the amount of sulfur value converted by oxidation to sulfate.

For trona scrubbing, the reactions occurring in the absorber 112 can be summarized by the following equations:

(1) $Na_2CO_3 + SO_2 \rightarrow Na_2SO_3 + CO_2 \uparrow$ (2) $2NaHCO_3 + SO_2 + H_2O \rightarrow Na_2SO_3 + 2H_2O + 2CO_2 \uparrow$ (3) $Na_2SO_3 + H_2O + SO_2(aq) \rightarrow 2NaHSO_3$ (4) $Na_2SO_3 + 0.5O_2$ (in flue gas) $\rightarrow Na_2SO_4$ (oxidation-side reaction).

Trona may also contain relatively insoluble materials such as dolomite, quartz, feldspar, clays, and shortite ($Na_2CO_3 \cdot 2CaCO_3$) which must be removed by conventional means such as filtration prior to forwarding the reaction mixture to electrodialytic water splitter. Equations (1), (3) and (4) or (2), (3) and (4) summarize the reactions for $Na_2CO_3$ (soda ash) scrubbing or $NaHCO_3$ scrubbing (nahcolite), respectively. The reaction mixture is fed via line 118 from the absorber 112 into acid compartment (A) of a two-compartment water splitter 120.

The $SO_2$ depleted gas exits the absorber 112 via a line 114 and presents no significant pollution problem because substantial amounts, i.e., at least about 40% to about 99%, of the $SO_2$ have been removed.

The electrodialytic water splitter 120 comprises a plurality of anion cation and bipolar ion exchange membranes arranged in an alternating fashion (to define alternating acid A and base B or alternating acid A, base B and salt S compartments) between two electrodes, thus forming an electrodialysis stack. The construction of electrodialysis stacks is well known and, for example, units are available commercially from Asahi Glass Co., 1-2, Marunochi 2-chrome, Chiyoda-ku, Tokyo, Japan; Ionics, Inc., Watertown, Mass. and other commercial sources. In addition, stacks which are suitable for electrolyte concentration such as the Asahi Model CU-IV, may be used for the water splitter. If the bipolar membrane used therein is adaptable to water splitting.

While the use of bipolar membranes is preferred because of the simplicity of the equipment, the water splitting operation may be carried out by using a third compartment containing anions or cations incapable of passing through the anion and cation membranes defining of the compartment. See for example, in U.S. Pat. Nos. 3,704,218 and 3,705,846. This compartment, when used for water splitting, operates by the same principles as the bipolar membrane. The bipolar membrane or its equivalent converts water into hydrogen and hydroxyl ion. Suitable bipolar membranes are described, for example, in U.S. Pat. No. 2,829,095 (which has reference to water splitting generally) or in U.S. Pat. No. 4,024,043 (single film bipolar membrane) and in U.S. Pat. No. 4,116,889 (cast bipolar membrane) and other types which effectively converts water into hydrogen and hydroxy ions may also be used.

The cation membranes useful in the electrodialytic water splitters of the present invention may be weakly acidic or strongly acidic cation permselective membranes. Particularly useful strongly acidic cation membranes are Dupont's Nafion ® acidic fluorocarbon membranes, especially Nafion ® 110 and 324. Other commercially available cation membranes may also be used.

The anion exchange membranes useful in electrodialytic water splitters of the present invention may be weakly basic or strongly basic anion permselective membranes such as commercially available AMF membranes or as described in U.S. Pat. No. 4,116,889. A particularly useful anion exchange membrane is the anion exchange membrane 204-UZL-386 available from Ionics, Inc., Watertown, Mass. Other commercially available anion membranes may also be used. The electrodialytic water splitter two compartment and its operation are described by reference to FIG. 2: A direct current passes from an anode 11 to a cathode 13. The reaction mixture comprising $Na_2SO_3$, $NaHSO_3$, and $Na_2SO_4$ from the absorber 112 is fed via line 118 to the acid compartments A. In the acid compartments A, hydrogen ions $H^+$ from the bipolar membranes 22 are introduced. At the same time, $Na^+$ ions migrate to the base compartments B through the cation membranes 20. The concentration of $H^+$ ions in the acid compartments A remains low until all of the $HSO_3^-$ ion converted to aqueous $SO_2$, i.e. $H_2SO_3$. This conversion promotes the effective transport of $Na^+$ ion (relative to $H^+$ ion) across the cation membrane. The presence of some $Na_2SO_4$ in the reaction mixture is a benefit to the effective operation of the electrodialytic stack since it raises the ratio of $Na^+/H^+$ ions in the acid compartments. The hydrogen-ion enriched aqueous solution produced in the acid compartment A is removed via line 122. Water or dilute NaOH (recycled via line 126) is fed via line 116 to the base compartments B. Some $SO_2$ gas formed in the acid compartments A (via internal acidification) will be lost to the base compartments B by diffusion of the $SO_2$ through the bipolar membranes 22 and cation membranes 20. The $SO_2$ reaching the base compartments reacts with the hydroxide formed in the base compartment B to produce $Na_2SO_3$ thereby contaminating the NaOH. The hydroxide ion enriched aqueous solution is; removed from the base compartments B via line 124.

Figure 2:
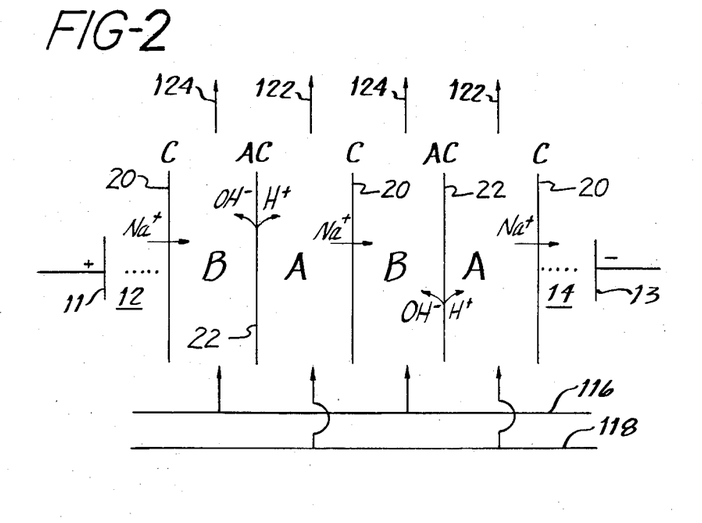
FIG. 2 is a fragmentary diagram of two unit cells of a two-compartment electrodialytic water splitter employed in the embodiment of FIG. 1.

The composition of the hydroxide ion-enriched solution will depend on the relative amounts of hydroxide ion-enriched aqueous solution and water 116 introduced into the base compartments B as well as the relative amount of $SO_2$ diffused into the base compartment. Normally, about 5-30% by weight NaOH and the hydroxide ion-enriched aqueous solution comprises about 0.1-10% by weight $Na_2SO_3$. Reductions in the sulfite concentration are controllable by regulating the treatment of the reaction mixture. The conversion of the reaction mixture may be made in a single pass through the stack by a feed and bleed apportionment method, or by passing the solutions through a series of stacks so that the solubility of $SO_2$ in water is not exceeded. Consequently, will no gas is formed inside the water splitting stack. Additionally or alternatively, splitter maybe operated with the pressure on the reaction mixture being greater than atmospheric which should reduce the formation of $SO_2$ gas.

The electrodialytic water splitter may be operated at any temperature between about 20° C. and 80° C., but more practically, should be operated at between about 35° and 55° C. By maintaining temperatures of at least about 40° C. to 55° C. in the electrodialytic stack, the overall current efficiency is improved by about 2%, compared to operating at temperatures less than about 40° C. (e.g., about 35° C.).

Referring to FIG. 1 containing the NaOH solution is withdrawn from the base compartments B via line 124 and not recycled is effect evaporator 128, which may be of any of a number of designs well known to those skilled in the art. Steam is injected via a line 129 into the triple effect evaporator 128 and concentrated NaOH, preferably 45-55 weight percent NaOH substantially free, i.e., containing less than about 0.2 weight percent $Na_2SO_3$, is recovered via line 130. Since $Na_2SO_3$ has a limited solubility in concentrated NaOH, solid $Na_2SO_3$ containing a small amount, i.e., about 5 weight % NaOH is recovered from the evaporator 128. A portion of the solid $Na_2SO_3$ in evaporator 128 may be removed therefrom and recycled to dissolution tank 104 via line 132. The hydrogen ion enriched aqueous solution from the acid compartments A exits the water splitter 120 as via a line 122 and is introduced into stripper 134 wherein it is heated to a temperature of about 65°–100° C. by steam supplied by line 146. The dissolved $SO_2$ is liberated and removed via line 136. The concentrated $SO_2$ (about 98% purity) collected from 136 may be converted to sulfur or sulfuric acid or compressed and recovered as liquid $SO_2$ by known technology. Alternatively the $SO_2$ may also be recovered by blowing air through the hydrogen ion-enriched aqueous solution in 134 without heating the same. The resultant mixture of $SO_2$, $N_2$, $O_2$ obtained from this operation would be suitable for the manufacture of sulfuric acid.

Other methods of recovering $SO_2$ from the hydrogen ion enriched aqueous solution include pressurizing the solution and obtaining liquid $SO_2$ as the overhead product from a distillation column, or fractionating the solution under reduced pressure at ambient temperatures to evolved $SO_2$ which can then be liquified by compression.

The product removed by the 138 from the bottom of the stripper 134 normally contains only $Na_2SO_4$ and water. At least a portion of the aqueous $Na_2SO_4$ solution is recycled via a valve 140, line 148, a valve 150, and a line 154 to the dissolution tank 140 for preparation of the sodium-based scrubbing solution. Additionally, some of the sulfate in line 148 may be purged via a line 152. In order to recover sulfate, the remainder of the product is forwarded via the valve 140 and line 142 to an evaporator 144 supplied with the steam via a link 156. Substantially pure, e.g., at least 98% pure, anhydrous $Na_2SO_4$ or optionally $Na_2SO_4.10H_2O$ is recovered from the evaporator 144 via line 158.

Figure 3:
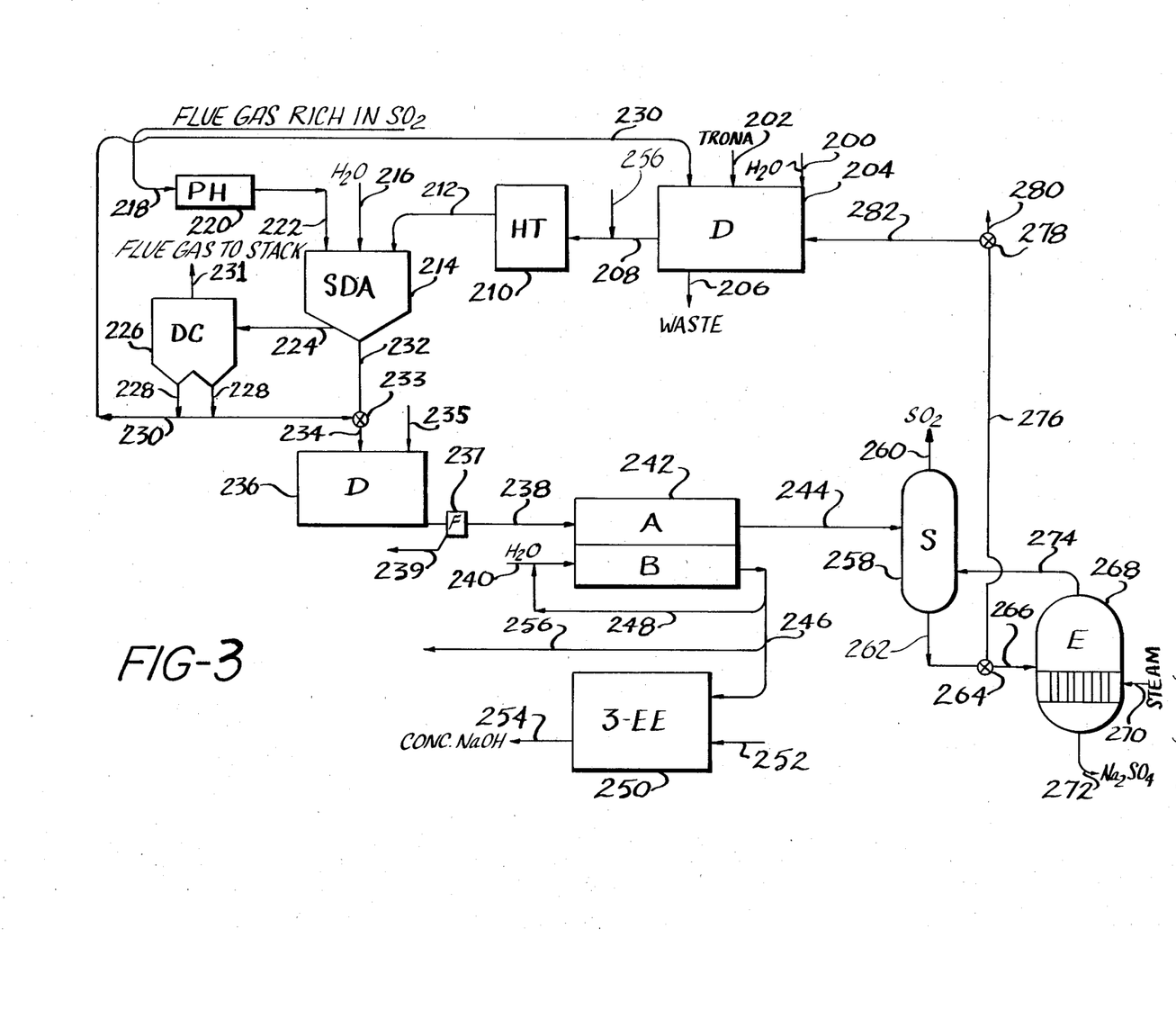
FIG. 3 is a flow diagram illustrating an alternate embodiment of the present invention using a spray-dryer absorber and a two-compartment electrodialytic water splitter.

In FIG. 3, the $SO_2$-rich gas is supplied to a line 218, optionally preheated in preheater 220, and forwarded via line 222 to a spray-dryer absorber 214 wherein it reacts with the alkaline sodium-based scrubbing solution, typically an aqueous solution of uncalcined trona ore prepared in dissolution tank 204 and forwarded via a line 208 through a heat tank 210 and line 212 to the spray-dryer absorber 214. In addition, the scrubbing solution may also contain aqueous sodium hydroxide which is supplied to the line 208. The spray-dryer absorber 214 may be one of a number of designs well known in the literature, such as disclosed in Power, October, 1982 at pages S-12 to S-17. The chemistry occurring in the spray-dryer absorber is analogous to the chemistry of the wet scrubbing described in reference to absorber 112 in FIG. 4 with the only significant difference being in the degree of water saturation. The alkaline sodium-based scrubbing solution is sprayed as atomized finely divided droplets the line 212 into an oncoming line of hot dusty $SO_2$-laden flue gas. As the $SO_2$-absorption reaction takes place, the water content of the scrubbing solution quickly evaporates. The absorption processes is normally completed within a few seconds.

The important parameters in spray-dryer absorption are: the size and dispersed nature of the droplets; the reagent ratio of the sodium to $SO_2$ (reagent ratios normally range from at least about 0.50 to 1.5 equivalents of sodium to about 1 equivalent of $SO_2$ reacted depending upon a variety of factors, among them the $SO_2$ content of the oncoming flue gas and the alkalinity of the fly ash, but higher or lower reagent ratios may be used without deleteriously affecting the present invention); the ratio of the liquid to gas in the spray-dryer absorber; the relationship of the absorption temperature to the adiabatic saturation temperature; and the liquid residence time available for absorption and evaporation. The operating temperature of the spray-dryer absorber is normally between about 7° and 20° C. above the saturation point temperature. Consistent with the embodiment illustrated by FIG. 1, about 40% up to about 99% of the $SO_2$ is typically removed from the gas. After the reaction takes place in the spray dryer absorber 214, the solid products are removed via a line 232 and at least a portion thereof are forwarded through a valve 233 and a line 234 to a dissolving tank 236 equipped with a make-up water line 238. The composition of the solid product comprises fly ash insolubles, sodium sulfate, sodium sulfites, and possibly sodium hydrogen sulfite, unreacted sodium carbonate and/or sodium bicarbonate. Typically, sulfites dominate the solid composition. The remainder of the solid products in the spray dryer absorber 214 and flue gas are removed via a line 224 and fed to a dust collector 226 which includes fabric filters (not shown). The dust collector (or baghouse) may be of any convenient design well known to those skilled in the art. In a preferred embodiment of the invention, the solid particles collected in the dust collector are removed via line 228 and either forwarded via line 230 either through valve the 233 and the line 234 to the dissolver 236 or to dissolution tank 204. The flue gases depleted in $SO_2$ (i.e., containing only 1 to about 60% of the $SO_2$ originally present) are removed via a line 232 and supplied to the stack (not shown).

An the alkaline solution is formed in dissolver 236 from the solids and water supplied by a line 235. After filtration in a filter 237 to remove fly ash insolubles (via) line 239 the resulting alkaline solution, comprises sodium sulfate, sodium sulfite, and optionally sodium hydrogen sulfite as well as sodium carbonate and/or sodium bicarbonate. The resulting alkaline solution is forwarded via line 238 to the acid compartment A of a two-compartment electrodialytic water splitter 242. If the solution in line 238 contains insolubles or ions such as calcium or magnesium which will interfere with the operation of the electrodialytic water splitter, further purification by known means such as, additional treatment via ion exchange may be necessary before forwarding same to the acid compartment A.

The operation of the electrodialytic water splitter 242 in analogous to the operation of the electrodialytic water splitter 120 shown in FIGS. 1 and 2.

In the acid compartment A, a hydrogen ion enriched aqueous solution is produced. In the base compartments B, a hydroxide ion enriched aqueous solution is produced which comprises NaOH, $Na_2SO_4$ (aq) and aqueous $SO_2$ (i.e., $H_2SO_3$).

The process for the production and recovery of $SO_2$, $Na_2SO_4$ and NaOH is analogous to that which was described with reference to FIG. 1. A portion of the NaOH-containing solution withdrawn from the base compartment B via line 246 is forwarded to a triple effect evaporator 250. Steam is injected via a line 252 and concentrated (preferably 45–55 weight percent) NaOH is recovered a line 254. Any solid $Na_2SO_3$ formed in the evaporator 250 may also be recovered. Some of the NaOH-containing solution from the base compartment is recycled via a line 248 and a line 240 (also used to supply make-up water to the base compartment B). The remaining base compartment solution withdrawn by the line 246 is forwarded to a line 256 which, in turn, supplies the line 208.

Hydrogen ion enriched aqueous solution formed in the acid compartment A is withdrawn via a line 244 and introduced into a stripper 258 (supplied with steam via a line 274). SO2 gas is liberated and withdrawn via line 260. The product removed by the line 262 from the stripper 258 contains only Na2SO4 and water. At least a portion of the aqueous Na2SO4 solution is recycled via a valve 264, a line 276, a valve 278 and a line 282 to the dissolution tank 204. Additionally, some of the sulfate solution in the line 276 may be purged via a line 280. In order to recover sulfate, the remainder of the product is forwarded via the valve 264 to a line 266 which feeds the product to an evaporator 268 supplied with steam via a line 270. Substantially pure sulfate (anhydrous Na2SO4 or Na2SO4.10H2O) is recovered from the evaporator through the line 272.

FIGS. 4 through 9 illustrate embodiments of the present invention wherein the spent scrubbing solutions are acidified and SO2 is removed prior to the electrodialytic water splitting operation. The advantages of external SO2 removal have been discussed hereinabove.

Figure 4:
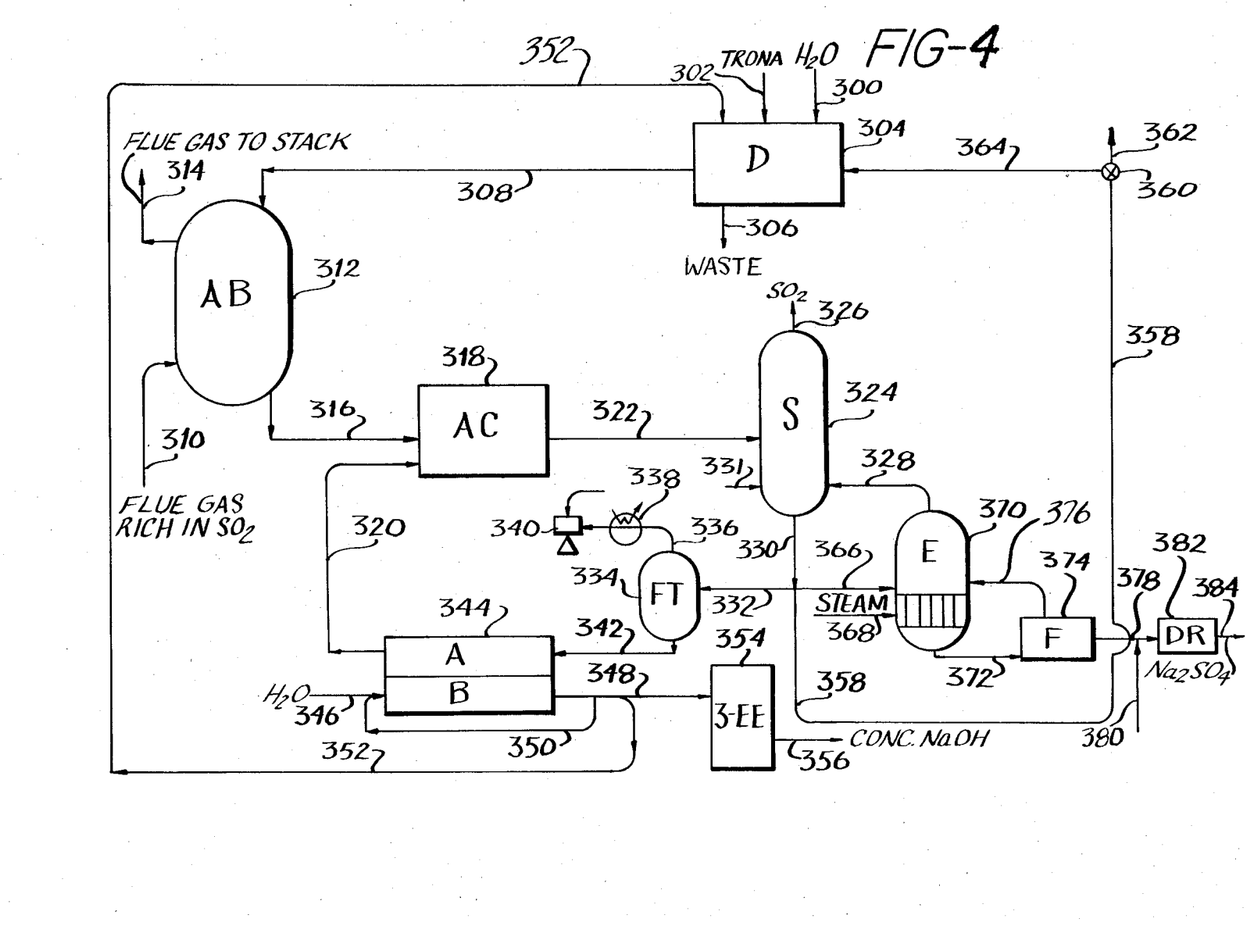
FIG. 4 is a flow diagram illustrating another embodiment of the present invention using wet scrubbing and $SO_2$ stripping prior to employing a two-compartment electrodialytic water splitter.

In FIG. 4, the SO2-laden gas enters an absorber 312 from a line 310, wherein it reacts with the alkaline sodium-based scrubbing solution obtained from a dissolution tank 304 and supplied by a line 308. The chemistry of the reactions in absorber 312 is analogous to that occurring in absorber 112 of FIG. 1. The SO2-depleted gas stream exits the absorber 312 via a line 314 and subsequently is vented to a stack (not shown). The spent scrubbing solution comprising sodium sulfate, sodium sulfite, and sodium hydrogen sulfite exits absorber 312 via a line 316 at a temperature of about 55° C. and is forwarded to an acidifier 318 wherein it reacts with a hydrogen ion-enriched aqueous solution comprising sodium sulfate and sulfuric acid from the acid (compartment A of a two-compartment water splitter 344) is fed via a line 320 to the acidifier 318. The exact composition of the spent scrubbing solution and the hydrogen ion enriched aqueous solution will depend on the composition of the reactants supplied to the absorber, the design of the absorber, the degree of SO2 removal sought, the amount of sulfur value converted by oxidation to sulfate and the efficiency of the electrodialytic water splitter. The hydrogen ion-enriched aqueous solution comprising sodium sulfate and sulfuric acid normally contains about 10 to about 30 weight percent sodium sulfate and about 1 to about 15 weight percent sulfuric acid. The chemical reactions in acidifier 318 between the in hydrogen ion-enriched aqueous solution and the spent scrubbing solution may be written as follows:

The acidified solution exiting from the acidifier 318 via a line 322, which comprises an aqueous sodium sulfate solution, normally 20 to 30 weight percent sodium sulfate, aqueous SO2 (sulfurous acid) and possibly small amounts (about 0-2%) of sulfuric acid, is forwarded to a stripper 324 wherein it is heated to a temperature of about 60° to 100° C. by steam (supplied by a line 328). The dissolved SO2 is liberated and removed via a line 326. The remaining solution in the stripper 324 normally contains only sodium sulfate and water at a temperature of about 60° to 100° C., preferably about 65° C.

At least a portion of the aqueous solution sulfate solution is withdrawn by a line 330 and forwarded via a line 332 to a flash tank 334 which is of any convenient design well known to those skilled in the art, and wherein the temperature is lowered to between 35° and 60° C., usually 35° to 55° C. The aqueous sodium sulfate solution is then removed from the flash tank 334 via a in line 342 at a typical temperature of about 40° to 45° C. and is introduced into the acid compartment A of a two-compartment electrodialytic water splitter 344. A solution comprising water and, optionally an aqueous sodium hydroxide solution containing sodium sulfate e.g., recycled from the base compartment B via a line 350 (is introduced into base compartment B of electrodialytic water splitter 344.

Figure 5:
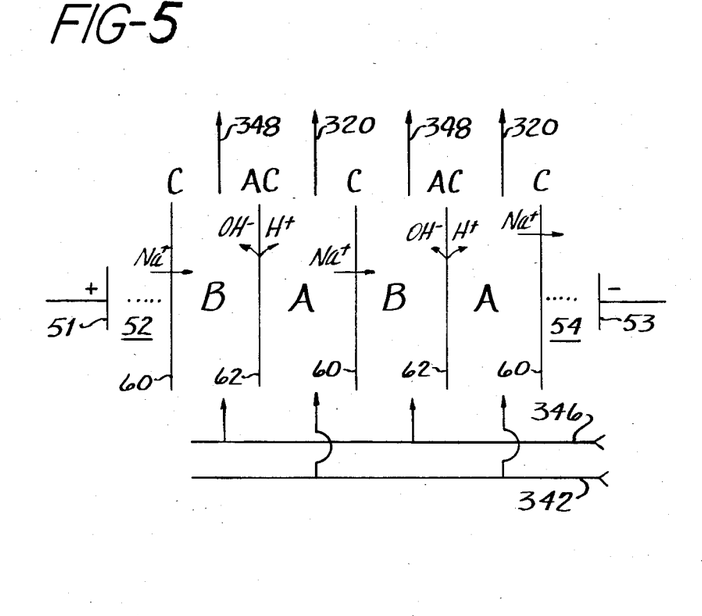
FIG. 5 is a fragmentary diagram of a two unit cells of a two-compartment electrodialytic water splitter employed in the embodiment depicted in FIG. 4.

The two-compartment electrodialytic water splitter 344 used in this embodiment of the process of the present invention is illustrated in FIG. 5.

The water splitter 344 comprises an anode 51 and a cathode 53 disposed in anolyte compartment 52 and catholyte compartment 54, respectively. Two unit cells are shown each of which comprises a base compartment B defined by a cation membrane 60 and an anion face of a bipolar membrane 62, and an acid compartment A defined by a cation membrane 60 and a cation face of a bipolar membrane 62. Current passes from the anode 51 to the cathode 53. In operation, hydrogen ions H+ from the bipolar membranes 62 are introduced into the acid compartment A. At the same time, Na+ ions migrate from the base compartment B through the cation membrane 60. A hydrogen ion enriched aqueous solution of sodium sulfate and sulfuric acid is produced in the acid compartment A and removed therefrom via a line 320. The line 320 operates to transfer the aqueous sodium sulfate/sulfuric acid solution to the acidification tank 318. A hydroxide ion-enriched aqueous solution comprising sodium hydroxide) typically 5 to 20 weight percent sodium hydroxide and about 0.01 to about 0.5 weight percent sodium sulfate, is produced in the base compartment B and transported therefrom via a line 348. As shown in FIG. 5, a portion of a hydroxide ion enriched aqueous solution is forwarded to the triple effect evaporator system 354. Concentrated sodium hydroxide is removed from triple effect evaporator 354 via a line 356. The sodium hydroxide product is typically between about 45 and 55 weight percent of sodium hydroxide and substantially free, that is, contains less than about 0.2 weight percent of sodium sulfate. Another portion of the sodium hydroxide solution is recycled via line 350 to the base compartment B. Additionally, any remaining sodium hydroxide solution in 348 may be removed via a line 352 and transferred to the alkaline sodium-based scrubbing solution in the dissolution tank 304.

Another portion of the aqueous sodium sulfate solution removed from stripper 324 via a line 330 is passed through a line 366 to an evaporator 370 wherein water is removed. The aqueous slurry containing sodium sulfate is forwarded via line 372 to a filter 374 (where the liquid is collected and recycled to the evaporator by a line 376). Subsquently, the filtrate is passed, by a line 378, to dryer 382 a wherein anhydrous sodium sulfate is produced. The anhydrous sodium sulfate is then removed from the dryer 382 via a line 384. The remaining portion of the aqueous sodium sulfate in line 330 is transferred to a line 358. The aqueous sodium sulfate passes along the line 358 and is transferred by a valve 360 (where some sulfate may be removed via a line 362) to a (where some sulfate may be removed via a line 362) to a and line 364 which is feeds aqueous sulfate to the dissolution tank 304.

Figure 6:
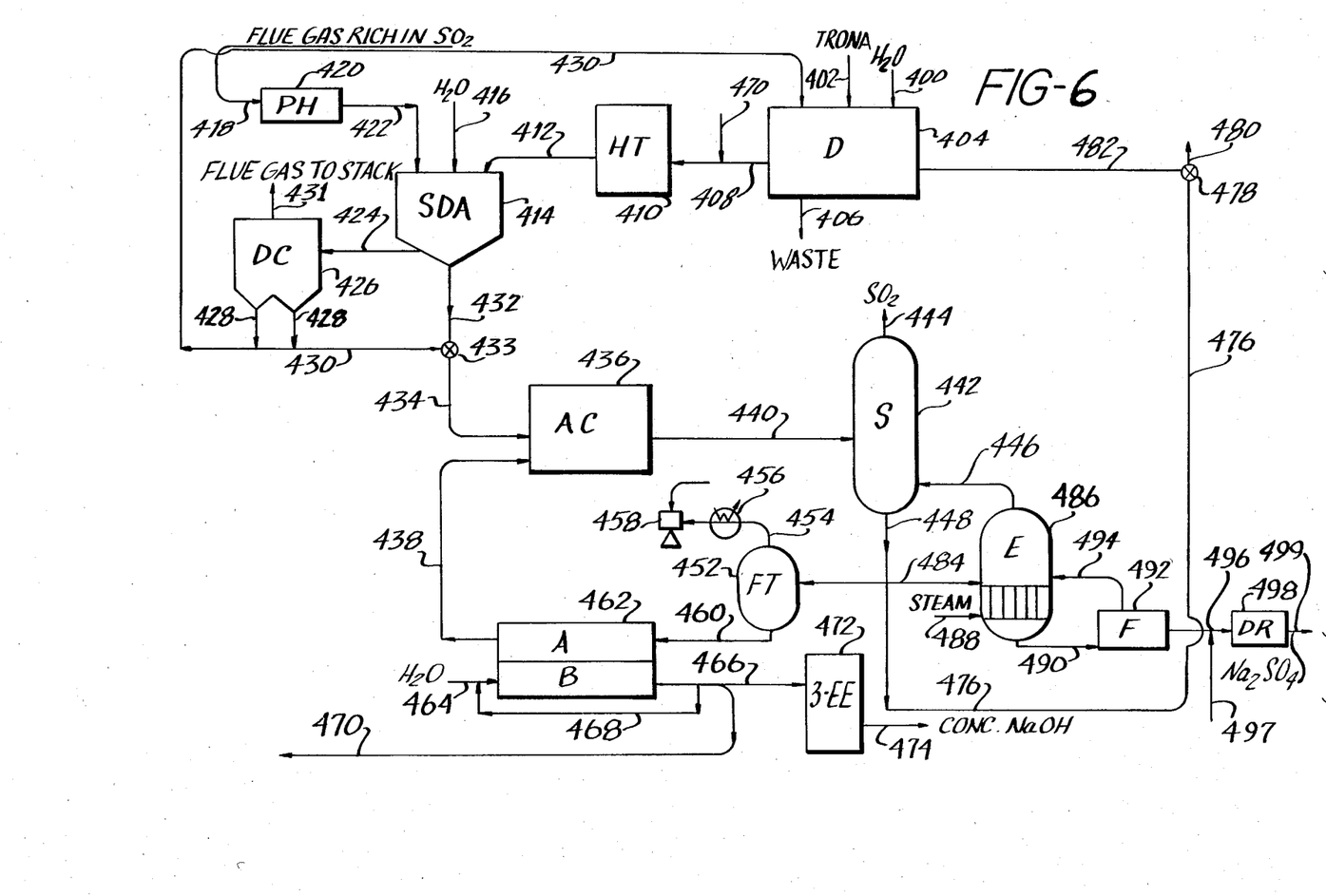
FIG. 6 is a flow diagram illustrating an alternate embodiment of the present invention using spray-dryer absorption and $SO_2$ stripping prior to employing a two-compartment electrodialytic water splitter.

FIG. 6 represents an alternative embodiment of the process illustrated in FIG. 5. The $SO_2$ rich gas supplied to a line 418, optionally heated in a preheater 420, and forwarded via line 422 to a spray dryer absorber 414 wherein it reacts with an alkaline sodium base scrubbing solution. The alkaline sodium based scrubbing solution is formed in a dissolution tank 404 and forwarded via a line 408 through a heat tank 410 to a line 412. Optionally, aqueous sodium hydroxide is supplied to a line 408. Operation of the spray dryer absorber is essentially the same as the operation of the absorber described with reference to FIG. 3.

A portion of the solid product from the spray dryer absorber 414 is removed via line 432. This portion is subsequently divided into two streams by a valve 433 which feeds one stream through a line 434 to an acidifier 436 and the other stream through a line 430 for recycling into the dissolution tank 404. The remainder of the solids and gases in the absorber 414 are removed via a line 424 and supplied to a dust collector 426. The dust collector operates in the same fashion as the dust collector 226 in FIG. 3 and the feeding system 428, 430 operates in the same manner as the feed system 228, 230 of FIG. 3. The flue gases, now depleted in $SO_2$, are vented via a line 432 to a stack (not shown).

The operation of the acidifier 436 which is supplied with reactants from the line 434 and a line 438 (supplying a hydrogen ion enriched aqueous solution of a composition as described in the embodiment of FIG. 4 produced in an acid compartment A of the electrodialytic water splitter 462) is the same as that of the acidifier 318. The acidified solution is removed from the acidifier 436 via a line 440 and forwarded to a stripper 442. The stripper 442 heats the acidified solution to about 60° C. to 100° C. (by a supply of steam from a line 446). The dissolved $SO_2$ is liberated and removed through a line 444. The remaining solution and the stripper 442, normally only sodium sulfate and water preferably a temperature of about 65° C., is withdrawn via a line 448. The withdrawn solution is then divided into portions which are supplied to lines 450, 476 and 484.

The withdrawn solution in line 450 is fed to a flash tank 452 which operates under the same parameters as described for the flask tank 334, and is converted to an aqueous sodium sulfate solution (typically at a temperature of about 40° to 45° C.) which is removed via a line 460 and supplied to the acid compartment A of the two compartment electrodialytic water splitter 462. To the base compartment B of the water splitter 462 is fed (via a line 464) a solution comprising water and, optionally, an aqueous sodium hydroxide solution containing sodium sulfite (e.g., recycled from the base compartment B via a line 468).

The design and operation of the two compartment water splitter is the same as that described with references to FIGS. 4 and 5 (note that feed lines 460 and 464 in FIG. 6 correspond to lines 342 and 346, respectively, and removal lines 438 and 446 correspond to lines 320 and 348, respectively). The hydroxide ion enriched aqueous solution produced in the base compartment A and comprising sodium hydroxide (typically 5–20 weight percent) and sodium sulfate (typically 0.01–0.5 weight percent) is apportioned between lines 468 (for recycle to the base compartment B) and 470 (for return to line 408), and a triple effect evaporator 472 (for conversion to concentrated NaOH and collection via a line 474, in a manner analogous to evaporator 354 and collection line 356 of FIG. 4).

Another portion of the aqueous sodium sulfate solution in line 448 is fed to an evaporator 486 wherein water is removed. The aqueous slurry comprising sodium sulfate is then forwarded via line 490 to a filter 492 and, subsequently, the filtrate is supplied to a line 496 for transport to a dryer 498. The material remaining in the filter is recycled to the evaporator by a line 446. In the dryer 498, anhydrous sodium sulfate is produced and can be removed through a line 449. The remaining portion of the aqueous sodium sulfate is supplied along a line 476 to a valve 478 where some of the sulfate may be removed and the remainder may be passed through a line 482 to the dissolution tank 404.

Figure 7:
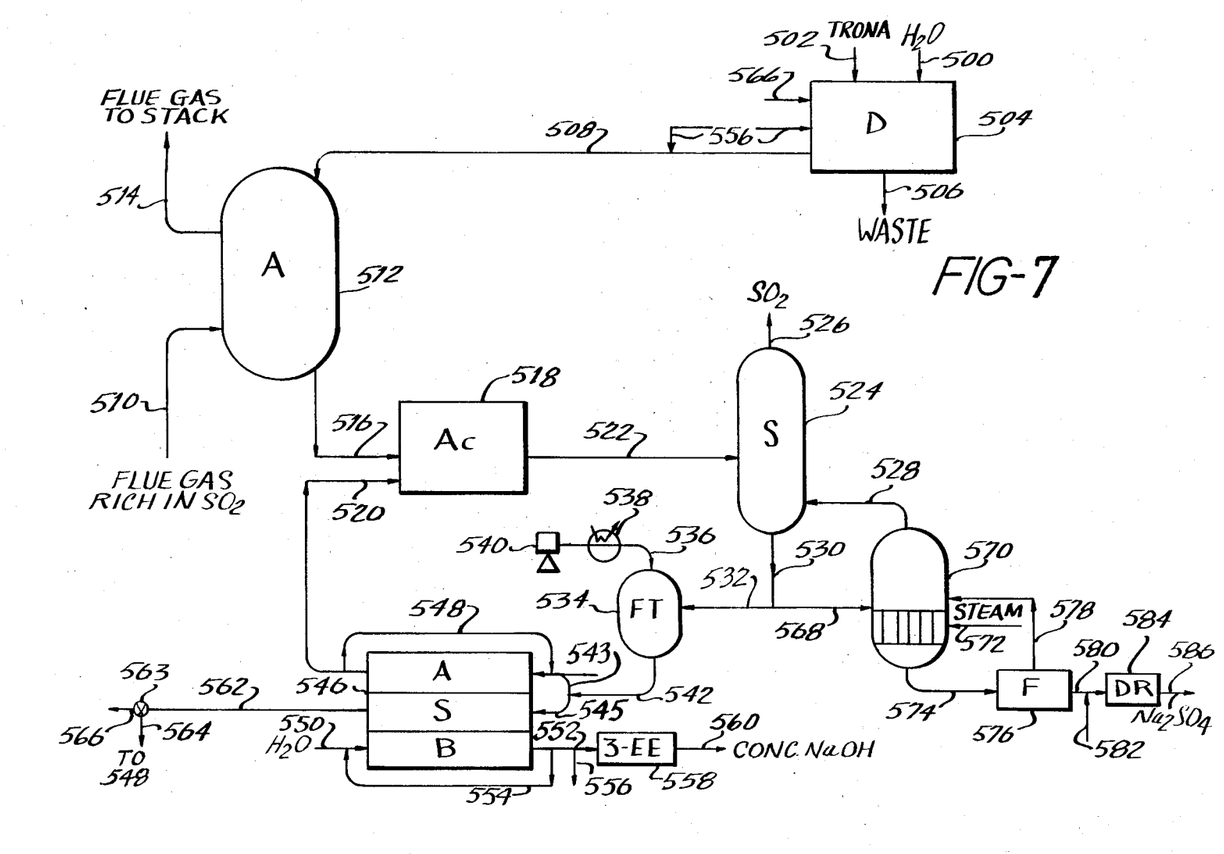
FIG. 7 is a flow diagram illustration still another embodiment of the present invention using wet scrubbing and $SO_2$ stripping prior to employing a three-compartment electrodialytic water splitter.

FIG. 7 illustrates an alternative embodiment of the process of the present invention employing a three-compartment electrodialytic water splitter. In FIG. 7, the $SO_2$-rich gas enters the absorber 512 from a line 510 wherein it reacts with an alkaline sodium-based scrubbing solution forwarded from a dissolution tank 504 via line 508. The composition of the alkaline sodium-based scrubbing solution in line 508 is typically an aqueous trona solution which optionally may contain sodium hydroxide and usually contains sodium sulfate (e.g., recycled from a salt compartments of the three-compartment electrodialytic water splitter 546). The design and operation of the absorber 512 is exactly analogous to the design and operation of absorber 112 illustrated in FIG. 1. The spent scrubbing solution from the absorber 512 (normally containing sodium sulfite, sodium hydrogen sulfite and sodium sulfate is forwarded via a line 516 to an acidifier 518. In the acidifier, the spent scrubbing solution is contacted with an aqueous hydrogen ion-enriched solution of sodium sulfate and sulfuric acid removed from an acid compartment A of the three-compartment electrodialytic water splitter 546 (and supplied via line 520) to form an aqueous solution containing sodium sulfate and sulfurous acid or (aqueous $SO_2$) which is removed via a line 522 and supplied to stripper 524. A concentrated highly pure $SO_2$ gas stream is produced in the stripper 524 and removed via a line 526. An aqueous solution normally containing sodium sulfate and water is removed from the bottom of the stripper 524 via a line 530.

By external acidification of the sulfite in the acidifier 518 and removal of $SO_2$ in the stripper 504, the feeds to and products from the water splitter are normally completely free of sulfite. At least a portion of the aqueous sodium sulfate solution in the line 530 is transferred, via a line 532, to a flash tank 534 of conventional design. An aqueous sodium sulfate solution at a temperature between about 35° and 60° C., normally 35°–55° C., is removed from the bottom of the flash tank via a line 542. At least a portion of the aqueous sodium sulfate solution in the line 542 is forwarded to the salt compartments via a line 545. A liquid comprising water is fed via a line 543 to the acid compartments A of the three-compartment electrodialytic water splitter 546. The liquid fed to the acid compartment A may also comprise electrolytes, such as a portion of the aqueous sodium sulfate fed to the salt comparatment and even acidified aqueous sodium sulfate (removed and recycled via a line 548) from the acid compartment. (A) Preferably the remainder of the aqueous sodium sulfate solution from the line 542 is forwarded to the acid compartment A via line 543. A liquid comprising water in a line 550 is introduced into the base compartment B of the three-compartment electrodialytic water splitter 546.

Figure 8:
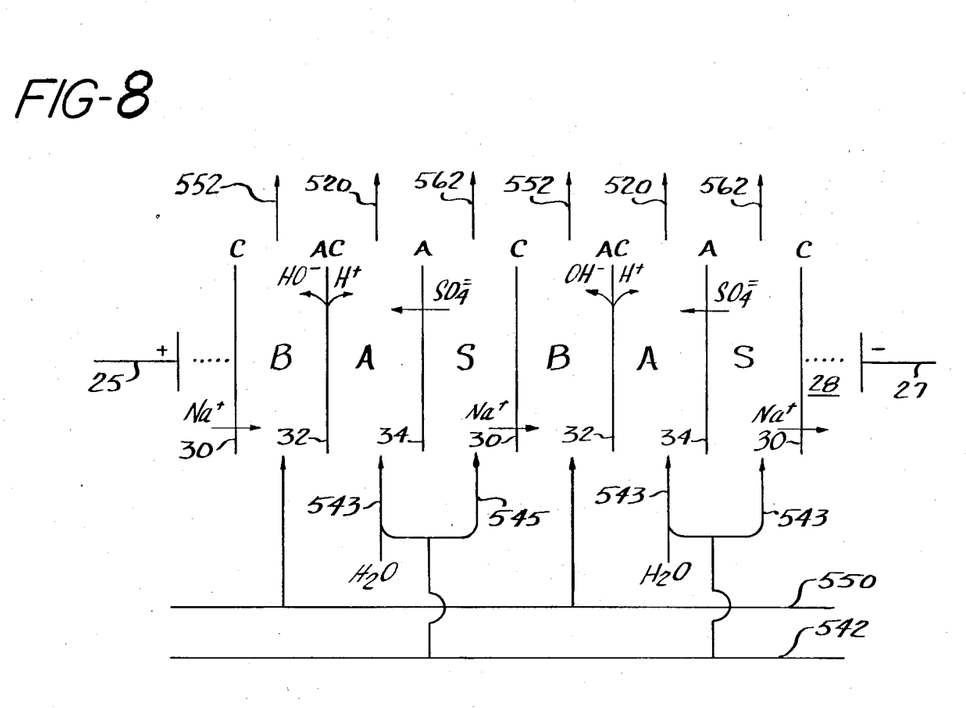
FIG. 8 is a fragmentary diagram of a two-unit cell of a three-compartment electrodialytic water splitter employed in the embodiment depicted in FIG. 7.

The three-compartment electrodialytic water splitter 546 used in the embodiment illustrated in FIG. 7 is detailed in FIG. 8. The three compartment water splitter incorporates a plurality of cation 30, bipolar 32 and anion exchange membranes 34 arranged in an alternating fashion between two electrodes 25 and 27 that form an electrodialytic stack. Each unit cell comprises a base B, acid A and salt S compartment. The cation and bipolar ion exchange membranes employed in FIG. 8 are analogous to those described with reference FIG. 2.

An aqueous sodium sulfate solution, containing a reduced amount of sodium sulfate as compared to the solution fed from the line 545 (normally about 5 to 10 weight percent sodium sulfate solution in water) A is removed from the salt compartment S via line 562. A valve 563 operates to feed at least a portion of the sodium sulfate solution to a line 566 for supply to the dissolution tank 504 (to aid in preparation of the sodium-based scrubbing solution). The remainder of the aqueous salt solution in line 562 may be added to the line 543 (via a line 548) as feed solution for the acid compartment.

A hydrogen ion-enriched aqueous solution comprising sodium sulfate and sulfuric acid, normally containing about 10 to about 30 weight percent of sodium sulfate and about 1 to about 15 weight percent of sulfuric acid, is withdrawn from the acid compartment A via a line 520 and is forwarded to the acidification tank 518. A hydroxide ion-enriched aqueous solution comprising sodium hydroxide, normally about 5 to 20 weight percent of sodium hydroxide and substantially free of sodium sulfate (that is, containing less than about 1 weight percent total of sodium sulfate), is removed from the base compartment B via a line 552 and transferred to a triple effect evaporator 558. A concentrated sodium hydroxide solution, normally about 45 to 55 weight percent sodium hydroxide, is produced in the triple effect evaporator system 558 and removed therefrom via a line 560. Alternatively at least a portion of the aqueous sodium hydroxide solution withdrawn via the line 552 from the base compartment B is recycled via a line 554 to the line 550 for supply to the base compartment B. Additionally a part of the aqueous sodium hydroxide solution withdrawn from base compartment B via the line 552 may be removed via a line 556 and forwarded to the sodium-based scrubbing solution in line 508 or dissolution tank 504.

The remainder of the aqueous sodium sulfate solution removed from the stripper 524 via the line 530 is forwarded via a line 568 to an evaporator 570. Steam from the evaporator 570 is thereafter removed by a line 528 and forwarded to the stripper 524. An aqueous slurry of sodium sulfate is removed from the bottom of the evaporator 570 via a line 574 and transferred to a filter 576. Mother liquor from the filtration step is returned via a line 578 to the evaporator 570. The filtrate is transferred via align 580 to a drier 584 wherein substantially anhydrous and highly pure sodium sulfate is produced and recovered via a line 586.

Figure 9:
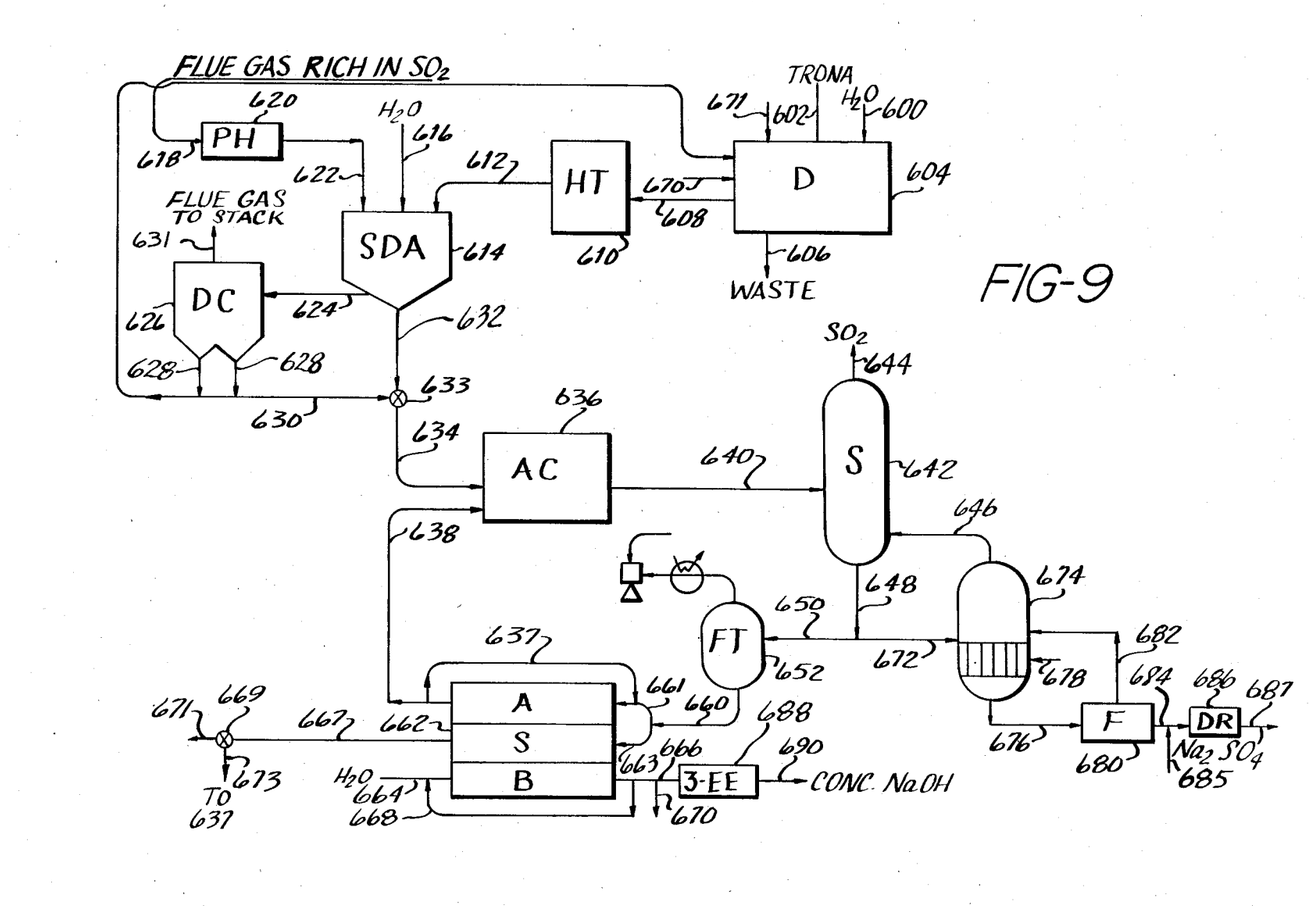
FIG. 9 is a flow diagram illustrating an alternate embodiment of the present invention using spray-dryer absorption and $SO_2$ stripping prior to employing a three-compartment electrodialytic water splitter.

FIG. 9 illustrates an alternative embodiment of the process of the present invention illustrated in FIG. 8.

The $SO_2$ rich gas is supplied to align 618, optionally heated in a preheater 620, and forwarded via a line 622 to spray drier absorber 614 wherein it reacts with an alkaline sodium base scrubbing solution. The alkaline base scrubbing solution is formed in dissolution tank 604 and forwarded via a line 608 through a heat tank 610 to a line 612 which feeds the absorber 614. Optionally, aqueous sodium hydroxide is applied to the dissolution tank 604. Operation of the spray drier absorber 614 is essential to the same as the operation of the absorber 214 described with reference to FIG. 3.

A portion of the solid product from the spray dryer absorber 614 is removed via a line 632. This portion is subsequently divided into two streams by a valve 633 which feeds one stream through a line 634 to an acidifier 636 and the other stream through a line 630 for recycling to the dissolution tank. The remainder of the solids and gases in the absorber 614 are removed via a line 624 and supplied to a dust collector 626. The dust collector operates in the same fashion as the dust collector 226 in FIG. 3 and the feed 628, 630 operates in the same manner as the feed system 228, 230 of FIG. 3. The flu gases, now depleted in $SO_2$, are vented via a line 631 to a stack (not shown).

The operation of the acidifier 636 which is supplied with reactants from the a line 634 and from a line 638 (which supplies a hydrogen ion enriched aqueous solution of a composition as described with reference to FIG. 4 and produced in an acid compartment A of the three compartment electrodialytic water splitter 662) is the same as the operation of the acidifier 436 of FIG. 6. The acidified solution is removed from the acidifier 636 via a line 640 and forwarded to a stripper 642. The stripper 642 heats the solidified solution to about 60° to 100° C. by steam (supplied by a line 646). The dissolved $SO_2$ is liberated and removed through a line 644. The remaining solution in the stripper 642, normally only sodium sulfate and water preferably at a temperature of about 65° C., is withdrawn via a line 648. The withdrawn solution is then divided into two portions which are supplied to lines 650 and 672. By external acidification of the sulfate in the acidifier 636 and removal of $SO_2$ in the stripper 642 that feeds to and products from the water splitter 662 are normally completely free of sulfite.

The withdrawn solution from the line 650 is fed to flash tank 652 which operates in a manner analogous to the flash tank 334 of FIG. 4, and is converted to an aqueous sodium sulfate solution (typically of a temperature of about 35° to 55° C.) which is removed via a line 660. At least a portion of the aqueous sodium sulfate along a line 660 is forwarded to the salt compartment S of the three compartment electrodialytic water splitter 662 via a line 663.

A liquid comprising water is fed via a line 661 to the asked compartment A. The liquid fed to the acid compartment A may also comprise electrolytes, such as a portion of the aqueous sodium sulfite fed to the salt compartment S and even acidified aqueous sodium sulfate (removed and recycled via a line 637 from the acid compartment A). Preferably, the remainder of the aqueous sodium sulfate from the line 637 is recycled to the acid compartment via the line 661. A liquid comprising water in a line 664 is introduced into the base compartment B.

The three compartment electrodiolytic water splitter 662 is constructed and operates in the same fashion as the water splitter 546 depicted schematically in FIG. 7 and in more detail in FIG. 8. An aqueous sodium sulfate solution containing a reduced amount of sodium sulfate as compared to the solution fed via a line 663 (normally about 5 to 10 weight % sodium sulfate solution in water) is removed from the salt compartment S via a line 667. A valve 669 operates to feed at least a portion of the solution to a line 671 for supply the dissolution tank 604. The remainder of the aqueous salt solution in the line 667 may be added to the line 637 (via a line 673) as feed solution for the acid compartment.

A hydrogen ion enriched aqueous solution comprising sodium sulfate and sulfuric acid, normally containing about 10 to about 30 weight % of sodium sulfate and about 1 to about 15 weight % of sulfuric acid, is withdrawn from the acid compartment via a line 662 and supplied to the acidification tank 636 by a line 638.

A hydroxide ion enriched aqueous solution comprising sodium hydroxide, normally about 5 to 20 weight % of NaOH and substantially free of $Na_2SO_4$ (i.e., containing less than about 1 weight % total of sodium sulfate), is removed from the base compartment via a line 666 and transferred to a triple effect evaporator 688. A concentrated NaOH solution, normally about 45 to 55 weight % NaOH, is produced in the evaporator 688 and removed therefrom by a line 690. Alternatively, at least a portion of the aqueous NaOH withdrawn by the line 666 is recycled via a line 668 to the line 664 for supply to the base compartment B. Additionally, a part of the aqueous sodium hydroxide from the line 666 maybe removed via a line 670 and forwarded to the dissolution tank 604.

The remainder of the aqueous sodium sulfate solution removed from the stripper 642 via the line 648 is forwarded to an evaporator 674 via the line 672. An aqueous slurry of sodium sulfate is removed from the evaporator 674 by a line 676 and transferred to a filter 680. Steam from the evaporator 674 is removed by a line 646 for supplied to the stripper 642. The mother liquor from the filtration step is returned by align 682 to the evaporator 674. The filtrate is transferred from a line 684 to a drier 686 wherein substantially anhydrous and highly pure sodium sulfate is produced and recovered by a line 687.

Additional modifications within the scope of the process the invention herein set forth involving the removal of $SO_2$ from gases containing same by spray drying or aqueous solution scrubbing with alkaline sodium sources and the production of $SO_2$ and NaOH from spent sodium scrubbing materials by two- and three-compartment water splitting will be apparent to those skilled in the art.

The invention is further illustrated by reference to the following example, the details of which should not be construed as limiting the invention except as may be required by the appended claims.

EXAMPLE 1

A typical mass flow for streams in FIG. 4 is given in Table I hereinbelow. The mass flow given is provided to assist in appreciating the potential commercial operation of a preferred embodiment of the process of the invention using two-compartment electrodialytic water splitting but does not necessarily reflect optimum or realizable conditions for such process.

The following calculations relate to a 500 MW power plant burning 3.5 weight % sulfur coal.

TABLE I

| Stream[1] | $Na_2SO_4$ | $Na_2CO_3$ | $NaHCO_3$ | $Na_2SO_3$ | $NaHSO_3$ | $SO_2$ | $H_2O$ |
|---|---|---|---|---|---|---|---|
| 300 | | | | | | | 44425 |
| 302[2] | | 15357 | 12169 | | | | 5592 |
| 306[3] | 24 | 20 | 26 | | | | 1445 |
| 308 | 18326 | 15337 | 12153 | | | | 137440 |
| 310[4] | | | | | | | |
| 314[4] | | | | | | | 5600 |
| 316 | 20145 | | | 5000 | 34223 | | 130181 |
| 320[5] | 58038 | | | | | | 366509 |
| 322 | 107181 | | | | | 23600 | 520328 |
| 326 | | | | | | 23600 | 1242 |
| 328 | | | | | | | 6100 |
| 330 | 107181 | | | | | | 519085 |
| 331[6] | | | | | | | 10900 |
| 332 | 87486 | | | | | | 423701 |
| 336 | | | | | | | 19500 |
| 346 | | | | | | | 54979 |
| 348[7] | 450 | | | | | | 85319 |
| 356[8] | 450 | | | | | | 15887 |
| 358 | 18350 | | | | | | 88868 |
| 366 | 1345 | | | | | | 6516 |
| 368 | | | | | | | 8000 |

TABLE I-continued

| Stream[1] | Na$_2$SO$_4$ | Na$_2$CO$_3$ | NaHCO$_3$ | Na$_2$SO$_3$ | NaHSO$_3$ | SO$_2$ | H$_2$O |
|---|---|---|---|---|---|---|---|
| 384 | 1795 | | | | | | |

FOOTNOTES TO TABLE I
[1]All streams are parts by weight
[2]Crude uncalcined trona also containing 4,516 parts of inerts
[3]Waste stream also containing 4,516 parts of inerts
[4]It has been assumed that 24,420 parts of SO$_2$ are absorbed from the gas stream 310 and that 205 parts of O$_2$ in the gas stream 310 have been consumed. The stream 314 contains 12,732 parts of CO$_2$ and 5,600 parts of H$_2$O, in addition to all other components originally present in the stream 310
[5]Composition of the product in the acid compartment A of the water splitter 344 which also contains 20,013 parts of H$_2$SO$_4$
[6]Low pressure steam (P = 1.2 kPa at 65° C.) fed to the stripper 324
[7]Composition of the product in the base compartment B of the water splitter 344 which also contains 16,337 parts of NaOH
[8]NaOH product composition recovered from the evaporator 354, contains 16,337 parts of NaOH

We claim:
1. A process which comprises the steps of:
    (a) contacting a gas comprising SO$_2$ with a reactant comprising Na$_2$CO$_3$, NaHCO$_3$, or mixtures thereof for a time sufficient to form a reaction mixture comprising sodium sulfite and sodium sulfate, and a gas depleted in SO$_2$;
    (b) contacting said reaction mixture with a hydrogen ion-enriched aqueous sodium sulfate solution for a time to produce an acidified aqueous solution comprising sodium sulfate and aqueous SO$_2$;
    separating said acidified solution into an aqueous solution comprising said sodium sulfate and gaseous SO$_2$;
    (d) recovering said gaseous SO$_2$;
    (e) introducing at least a portion of said aqueous solution substantially free of SO$_2$ and comprising sodium sulfate, and a liquid comprising water to an electrodialytic water splitter;
    (f) passing direct current through said electrodialytic water splitter to produce a hydrogen ion-enriched aqueous sodium sulfate-containing solution and a hydroxide ion-enriched aqueous solution;
    (g) withdrawing the hydrogen ion-enriched sodium sulfate-containing solution from the electrodialytic water splitter; and
    (h) withdrawing the hydroxide ion-enriched aqueous solution from the electrodialytic water splitter.
2. The process of claim 1 wherein the Na$_2$CO$_3$, NaHCO$_3$, or mixtures thereof is derived from trona ore, nahcolite ore, soda ash or hydrates thereof.
3. The process of claim 1 wherein the reactant is an aqueous slurry.
4. The process of claim 3 wherein the contacting step (a) is performed in a spray dryer absorber.
5. The process of claim 1 wherein the reactant is an aqueous solution.
6. The process of claim 5 wherein the aqueous solution is formed by dissolving trona ore, nahcolite ore, soda ash or hydrates thereof in a liquid comprising water.
7. The process of claim 1 further comprising the steps of:
    dividing a portion of said aqueous solution substantially free of SO$_2$ and comprising sodium sulfate into two streams; evaporating a first of the two streams to produce a solid comprising sodium sulfate; and, employing a second of the two streams to prepare the reactant.
8. The process of claim 1 which further comprises maintaining the temperature in the electrodialytic water splitter at a value of at least 35° C.
9. The process of claim 1 wherein the hydrogen ion enriched aqueous sodium sulfate-containing solution produced in the electrodialytic water splitter is employed in the contacting step (b).
10. The process of claim 1 wherein the reactant further comprises a portion of the hydroxide ion-enriched aqueous solution withdrawn from said electrodialytic water splitter and further comprises between about 5 and 30 weight % sodium hydroxide.
11. The process of claim 1 which further comprises the step of processing said aqueous hydroxide ion-enriched solution to produce an aqueous stream containing between about 45 and 55 weight % sodium hydroxide and substantially free of sodium sulfite.
12. The process of claim 1 wherein the gas comprising SO$_2$ is the combustion gas from a boiler which burns a sulfur-containing fuel.
13. The process of claim 1 wherein the aqueous solution substantially free of SO$_2$ and comprising sodium sulfate is fed to an acid compartment of the electrodialytic water splitter.
14. The process of claim 13 wherein the liquid comprising water is fed to a base compartment of the electrodialytic water splitter.
15. The process of claim 14 wherein the electrodialytic water splitter comprises at least one unit cell, each unit cell having an acid compartment and a base compartment.
16. The process of claim 14 wherein the electrodialytic water splitter comprises at least one unit cell, each unit cell having an acid compartment, a base compartment and a salt compartment.
17. The process of claim 16 wherein an aqueous sodium sulfate solution is fed to the salt compartment.
18. The process of claim 17 wherein an aqueous salt solution comprising a reduced concentration of sodium sulfate as compared to said aqueous sodium sulfate solution is removed from the salt compartment.
19. The process of claim 18 further comprising the step of supplying a portion of said aqueous salt solution for contact with said gas comprising SO$_2$.

* * * * *